United States Patent [19]

Kubo

[11] Patent Number: 4,828,194
[45] Date of Patent: May 9, 1989

[54] APPARATUS FOR WINDING MAGNETIC TAPE INTO CASSETTES

[75] Inventor: Toyohide Kubo, Tokushima, Japan

[73] Assignee: Awa Engineering Co., Ltd., Tokushima, Japan

[21] Appl. No.: 131,008

[22] Filed: Dec. 10, 1987

Related U.S. Application Data

[63] Continuation of Ser. No. 911,985, Sep. 26, 1986, Pat. No. 4,734,154.

[30] Foreign Application Priority Data

Oct. 9, 1985 [JP] Japan .............................. 60-225889
Oct. 9, 1985 [JP] Japan .............................. 60-225890

[51] Int. Cl.$^4$ .......................... B31F 5/06; B65H 21/00
[52] U.S. Cl. ................... 242/56 R; 156/159; 156/502; 156/505
[58] Field of Search ............... 156/502, 505, 159; 242/56 R, 58.1

[56] References Cited

U.S. PATENT DOCUMENTS

| | | | |
|---|---|---|---|
| 3,737,358 | 6/1973 | King | 156/502 |
| 3,797,770 | 3/1974 | Hosoda et al. | 242/56 R |
| 3,825,461 | 7/1974 | Gorman | 156/502 |
| 4,175,999 | 11/1979 | Schoettle et al. | 156/505 |
| 4,586,672 | 5/1986 | King et al. | 156/502 |
| 4,699,328 | 10/1987 | Kreeft et al. | 156/502 |

Primary Examiner—Michael Wityshyn
Attorney, Agent, or Firm—Wenderoth, Lind & Ponack

[57] ABSTRACT

An apparatus for winding magnetic tape into a cassette positions and holds a cassette case, extracts and retains leader tape, cuts and splices leader tape to magnetic tape, and winds magnetic tape onto a hub inside the cassette case. After a predetermined amount of magnetic tape has been wound on the hub, the magnetic tape is retained, cut, spliced to leader tape, and the extracted slack tape is wound into the cassette case. The tape retaining mechanism has a first and second tape retainer which separately hold the cut ends of leader tape, and a third tape retainer which holds the cut end of magnetic tape. The first and second tape retainers attach to the extracted leader tape, and are positioned with their attachment surfaces adjacent to a front cavity of the cassette case. Once the leader tape has been cut, one of the first and second tape retainers is swung away from the cavity to separate the cut tape ends. Then, the magnetic tape can be spliced to one of the separated cut ends and wound into the cassette. The magnetic tape is cut and spliced to the other of the cut ends of the leader tape.

3 Claims, 8 Drawing Sheets

APPARATUS FOR WINDING MAGNETIC TAPE INTO CASSETTES

This application is a continuation of U.S. Application Ser. No. 911,985, filed Sept. 26, 1986, now U.S. Pat. No. 4,734,154.

BACKGROUND OF THE INVENTION

1. Field of the Invention:

This invention relates to apparatuses for winding magnetic tape into cassette cases with guard panels, and especially relates to apparatuses which extract leader tape from a cassette case, connect magnetic tape between the leader tape, and wind the tape onto a hub inside the cassette case.

2. DESCRIPTION OF THE RELATED ART:

The trend in magnetic tape in recent years has been toward higher recording density, and as a result, the sensitivity to foreign particles on the tape surface has increased. Foreign objects on the surface of magnetic data tape, used in computers, etc., are a cause of data recording errors. Foreign objects on the surface of video tape are a source of interference and poor picture quality. Foreign objects on the surface of audio magnetic tape, recorded by PCM, etc., are a source of noise.

There are two basic production methods for magnetic recording tape cassettes. The first method involves loading cassette cases with reel hubs which have already been wound with magnetic tape outside the case. This method requires a large complex apparatus, but the magnetic tape winding time is short, and the processing rate is high. This method is suitable for large scale production facilities.

In the second method, cassettes are prepared by loading reel hubs joined by a length of leader tape into cassette cases. Leader tape is extracted from each cassette case, magnetic tape is connected to the leader tape, and a hub is rotated to wind magnetic tape into the cassette case. This method can be performed by a simple apparatus, and since the magnetic tape goes directly into the cassette case upon winding, the amount of dust and foreign object attachment to the tape surface can be reduced.

The present invention is an improved apparatus performing the second method, which was specially developed to reduce the amount of dust attachment to the surface of the magnetic tape.

Figure 9:
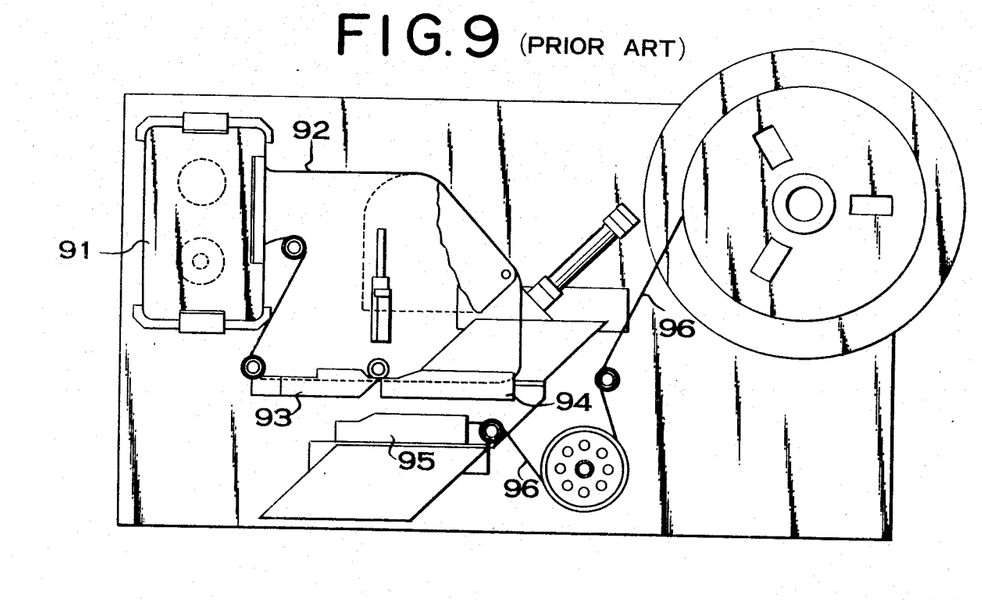
FIG. 9 is a front view of a specific example of a prior art tape winding apparatus.

An apparatus, which extracts leader tape from a cassette case, connects magnetic tape, and winds the magnetic tape into the case, is known (Japanese Patent Publication No. 45203/1977). In this apparatus, as shown in FIG. 9, leader tape 92 is extracted from the cassette case 91, is and attached to the first 93 and second 94 tape retainers. The leader tape 92 is cut between the first 93 and second 94 tape retainers to which it is attached, and the third tape retainer 95, which moves as a unit with the second tape retainer 94 and holds magnetic tape 96, is moved next to the first tape retainer 93. Magnetic tape 96 is connected to the end of the leader tape 92, the tape is released from the first 93 and third 95 tape retainers, and the hub inside the cassette case is rotated to wind up the tape. After a predetermined length of magnetic tape 96 has been wound, it is again attached to, and cut between, the first 93 and third 95 tape retainers. The second 94 and third 95 tape retainers are then moved such that the second tape retainer 94 is put next to the first tape retainer 93, the end of the magnetic tape 96 is joined to the previously cut end of the leader tape 92, and the remaining extracted tape is wound into the cassette case.

In addition to this, an apparatus with a different system of supplying magnetic tape to the severed leader tape has also been developed (Japanese Patent Publication No. 30444/1974). In this apparatus as well, leader tape is extracted from the cassette case, the leader tape is cut, and magnetic tape is joined to one end of the leader tape. After magnetic tape is wound into the cassette case, it is cut, and joined to the other end of the leader tape.

These former models have the drawback that since the tape cutting and splicing mechanisms are relatively far from the cassette case, a considerable length of leader tape is extracted from the cassette, and thus, dust and other foreign particles easily collect on the leader and magnetic tape surfaces during cutting and splicing.

The recording and playback quality of high quality magnetic tape depends critically upon the minimization of dust and other foreign particles on the tape surface. In particular, particles such as dust attach to the polyester of other synthetic resin type leader tape which is extracted from the cassette case. Since synthetic resin film like polyester film is a good insulator and its surface is easily charged, static electricity attracts foreign particles. Since magnetic materials like iron oxide and pure iron are attached to the surface of magnetic tape, it is more conductive than leader tape, and consequently less likely to become statically charged and pick up dust, etc. than leader tape. There is no degradation of recording or playback quality as long as dust and foreign objects attached to the surface of the leader tape are not transferred to the magnetic tape. However, the foreign objects attached to the leader tape get on the surface of cassette parts such as the guide rollers, and are transferred to the magnetic tape. Therefore, it is important to minimize leader tape dust and foreign object attachment for high density magnetic recording applications.

Once tape has been wound into the cassette case, almost no dust gets on the tape inside, but the tape between the reels exposed outside the cassette is easily contaminated. Therefore, cassette cases equipped with guard panels, that are free to open and close over the exposed tape, preventing dust, and contamination during nonuse, etc., are employed.

BRIEF DESCRIPTION OF THE DRAWINGS

FIG. 1 is a front view.

DETAILED DESCRIPTION OF THE PREFERRED EMBODIMENTS

The following provides an illustrated description of the preferred embodiment(s) of the present invention.

Figure 1:
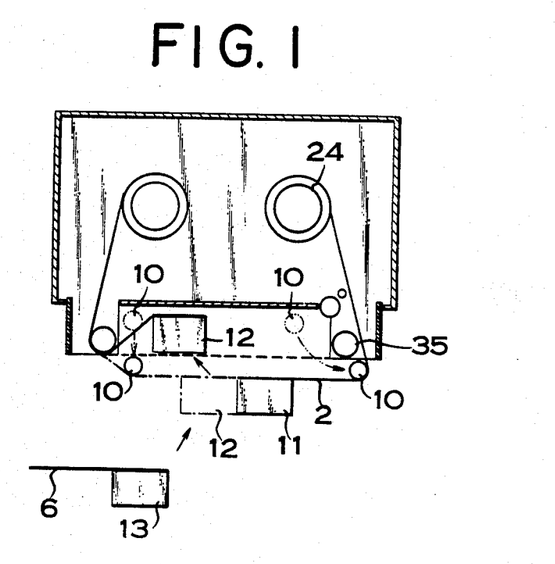
Figure 2:
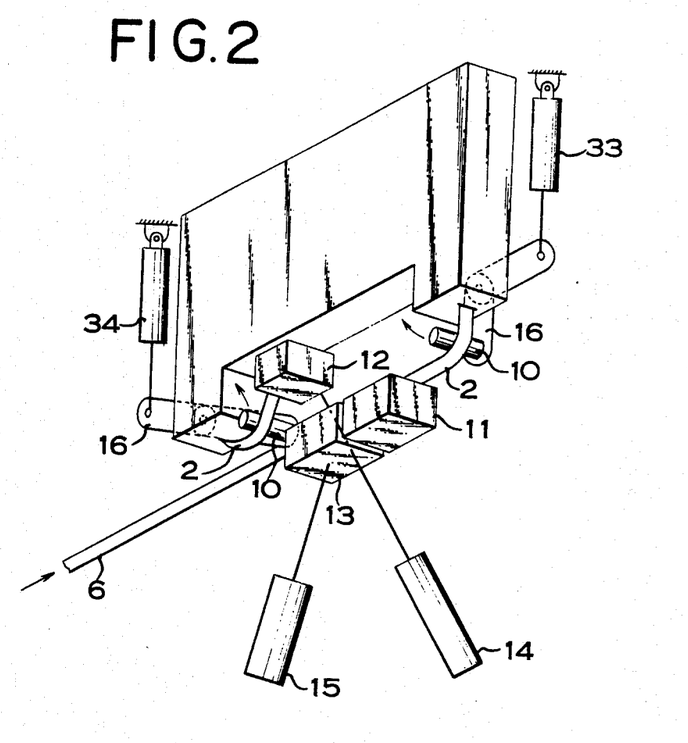
FIG. 2 is an oblique view showing, in outline form, the movement of the retaining means of an apparatus for winding tape into cassettes according to the present invention.
Figure 3:
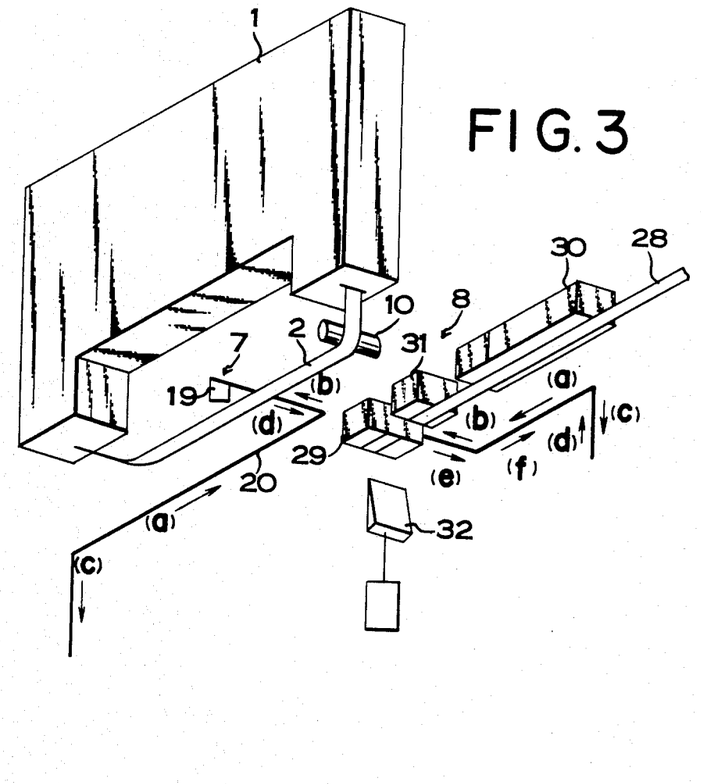
FIG. 3 is an abbreviated oblique view showing the cutting and splicing means of the present invention.

The device for winding cassettes with magnetic tape shown in FIG. 1 through FIG. 3 comprises: a retaining means, which holds an end of magnetic tape 6, as well as leader tape 2, unwound from a cassette case 1 secured at a set location by a positioning means (not illustrated); a cutting means 7, which cuts the leader tape 2 and magnetic tape 6 held by the retaining means; a splicing means 8, which joins the cut leader tape 2 and magnetic tape 6 by attaching splicing tape; and a winding means (not illustrated), which rotates one of the hubs 24, inside the cassette case, to wind up magnetic tape 6.

Figure 4:
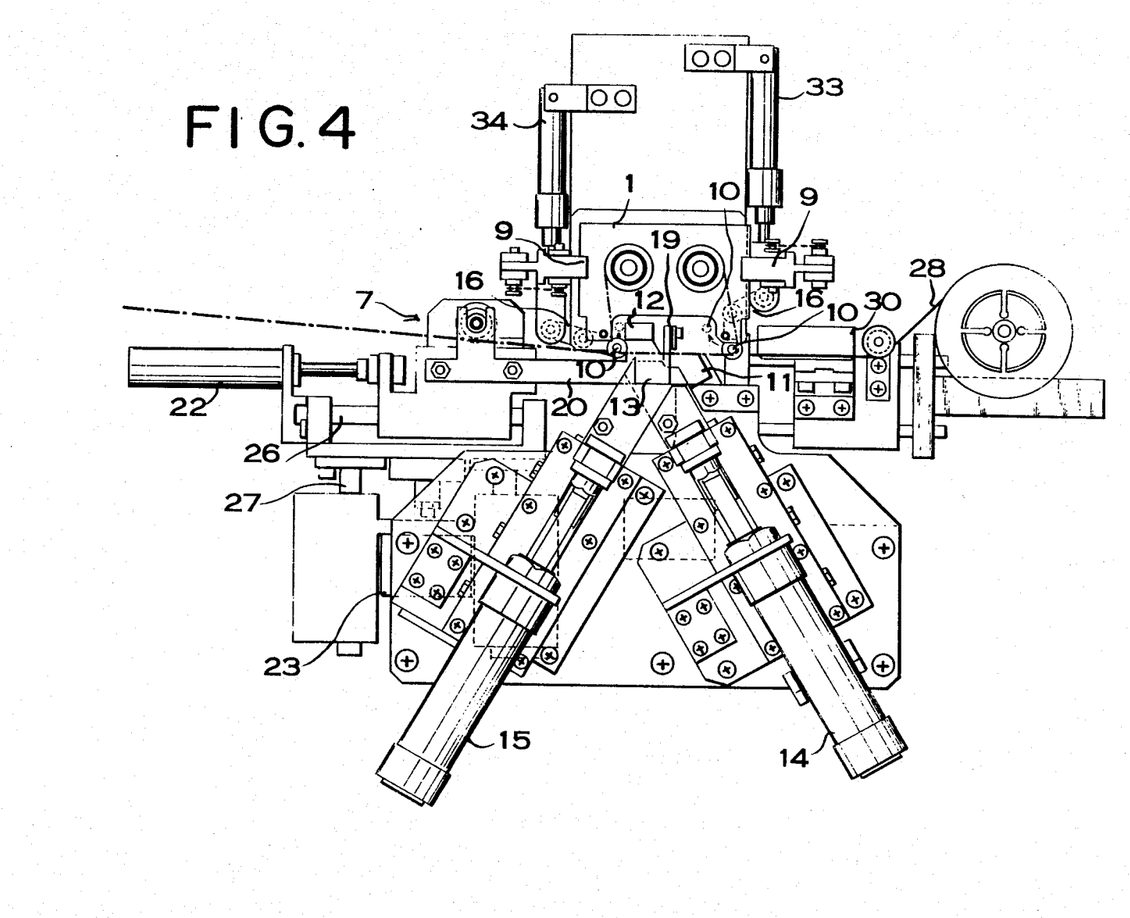
FIG. 4 is a front view of a tape winding apparatus according to an embodiment of the present invention.

The cassette case 1 positioning means has been used in conventional models. Any arrangement which can secure the cassette case in a fixed position, and can open the guard panel may be used. For example, an arrangement with claws 9 located on both sides of the cassette case, as shown in FIG. 4, can be used. The claws 9 apply pressure to grip the cassette case 1 by mean so of springs or other flexible media, or by means of a pressure cylinder.

The cassette case 1 guard panel opening apparatus is also a standard apparatus used in conventional models. For example, an apparatus which releases the guard panel lock and opens the guard panel with an arm or similar structure may be used.

The retaining means comprises: two tape extraction rollers 10, which draw leader tape 2 from the cassette; a first 11, second 12, and third 13 tape retainer, which attach to the back side of the leader tape 2 and the magnetic tape 5; and two pressure cylinders 14 and 15 which move the second 12 and third 13 tape retainers.

The tape extraction rollers 10 draw leader tape 2 from the cassette case 1 and guide it to the attachment surfaces of the first 11 and second 12 tape retainers. The two tape extraction rollers 10 are fixed to two tape extraction arms 16, in a manner that allows them freedom to rotate. The tape extraction rollers 10 are moved by the tape extraction arms 16 from the positions shown by broken lines in FIG. 4, to the positions shown by solid lines, thereby unwinding leader tape 2 from the cassette case 1.

As shown in FIG. 2, the tape extraction arms 16 are installed behind the cassette case 1, and are free to swing through an arc disposed in a vertical plane. One end of each tape extraction arm 16 is attached at a right angle to a tape extraction roller 10, while the other end is connected through a rod to a pressure cylinder. There are two pressure cylinders 33 and 24 which activate the two tape extraction arms 16.

Although it is not illustrated, suction holes are provided on the upper (attachment) surfaces of the first 11, second 12, and third 13 tape retainers for the purpose of holding leader tape 2 and magnetic tape 6 in place. These suction holes are connected to a vacuum system.

Static electricity can be used in place of suction for the attachment of tape to the tape retainers 11, 12, and 13, etc.

The first tape retainer 11 is fixed to a stationary frame, while the second 12 and third 13 tape retainers connect to, and are moved by pressure cylinders 14 and 15.

Leader tape 2 is drawn form the cassette case 1 and is attached to the second tape retainer 12. As shown in FIG. 1 and FIG. 2, the second tape retainer 12 assumes a standby position inside the cassette case front cavity while the magnetic tape 6 winding process is performed.

The third tape retainer 13 attaches to the magnetic tape 6 only. It is moved to the position shown in FIG. 2 (the broken line position of FIG. 1) for facilitating splicing of the magnetic tape with the leader tape 2 and the winding thereof into the cassette case 1, and it is moved to the solid line position of FIG. 1 during leader tape cutting.

Figure 5:
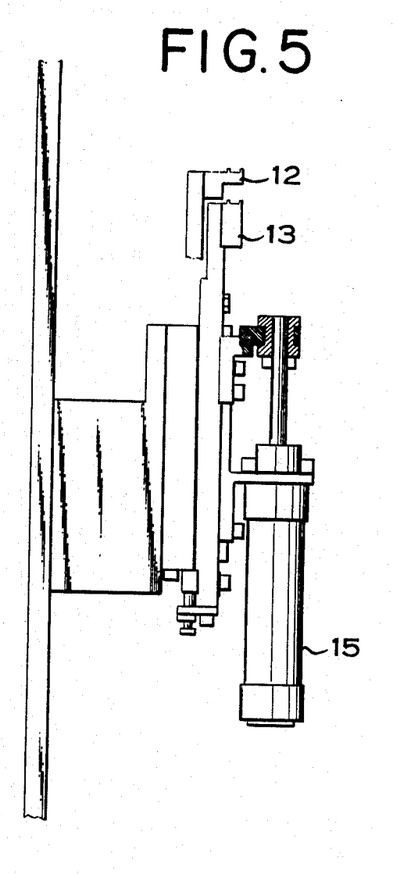
FIG. 5 is a side view showing the assembly for shuttling the second and third tape retainers according to the present invention.

As shown in FIG. 2 and FIG. 4, the second 12 and third 13 tape retainers are fixed to the ends of rods connected to the pressure cylinders 14 and 15. As shown in FIG. 2 and FIG. 5, the second 12 and third 13 tape retainers are positioned to hold tape in the same vertical plane, however the pressure cylinder rod for the second tape retainer 12 is located in back of that for the third tape retainer 13 to allow independent movement.

Figure 6:
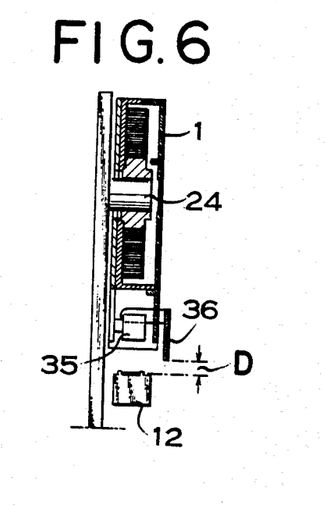
FIG. 6 is a side cutaway view showing a cassette case front cavity.

As shown in FIG. 6, while the first 11 and second 12 tape retainers hold the uncut leader tape 2, the area around the tape is covered by the cassette case 1 and the guard panel, thereby offering protection against the dust and foreign objects. For this reason, the first 11 and second 12 tape retainers are located next to the cassette case guard panel at this stage.

In this case, the extracted leader tape 2 is surrounded by the first 11 and second 12 tape retainers, the guard panel, and the cassette case 1, and as shown in FIG. 6, a gap D occurs between the guard panel and the tape retainer attachment surfaces. The width of this gap D is, for example, 30 mm or less, more desirably 25 mm or less, and ideally 10 mm or less.

During the procedure of winding magnetic tape 6 into the cassette case 1, the second tape retainer 12 is moved out of the path of the magnetic tape 6, but its standby position is such that leader tape 2 is not exposed outside the cassette case 1 for a long period of time. Therefore, the standby position of the second tape retainer 12 is such that its attachment surface is, for example, 40 mm or less, and more desirably 35 mm or less from the guard panel.

As illustrated in FIG. 1 and FIG. 2, an ideal standby position for the second tape retainer 12 is within the cassette case front cavity. In this case, the leader tape 2 is surrounded by the tape retainer and the cassette case 1.

Figure 7:
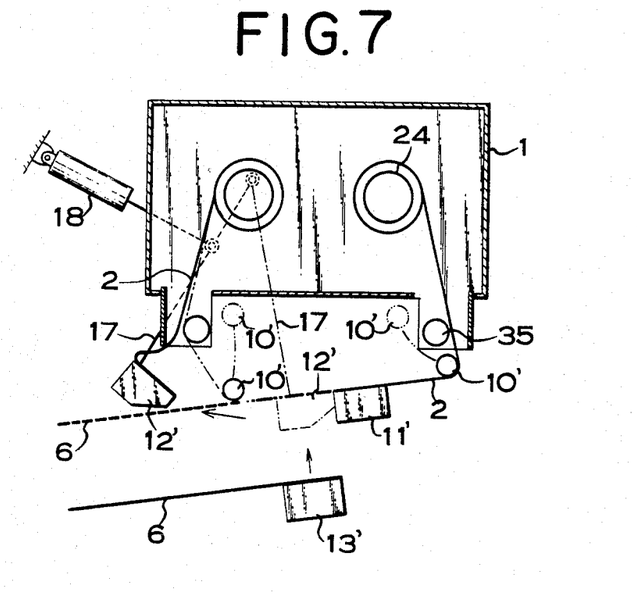
FIG. 7 is an abbreviated front view showing the tape retainer movement of another embodiment of the present invention.

The tape retainer 12 of the second embodiment of the present invention shown in FIG. 7 is fixed to the end of a rotating arm 17, which swings that tape retainer 12 from a position adjacent to the first tape retainer 111, in a direction away from the cassette case. The rotating arm 17 is activated by a pressure cylinder 18, and is installed behind the cassette case 1 to avoid interference with the cassette.

Figure 8:
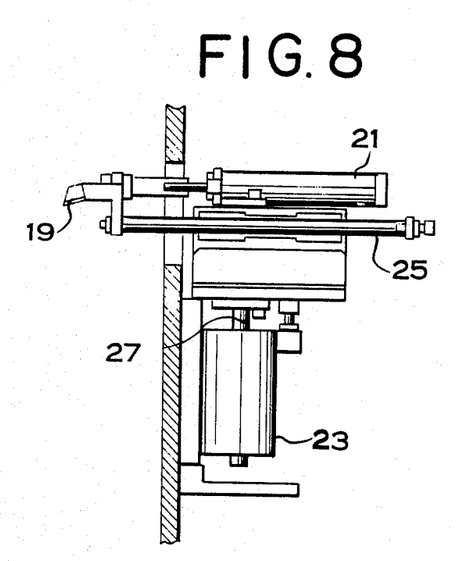
FIG. 8 is a side view showing the fore and aft movement of the cutter employed by the present invention.

As shown in FIG. 3, FIG. 4, and FIG. 8, the cutting means 7 comprises a cutter 19, a movable frame 20 which manipulates the cutter 19 to sever the tape, and referring to the orientation of the apparatus as shown in FIG. 4, a pressure cylinder 21 which moves the frame 20 fore and aft, a pressure cylinder 22 which moves frame 20 left and right, and a pressure cylinder 23 which moves the frame 20 up and down.

As shown in FIG. 4 and FIG. 8, the movable frame 20 is fixed to the end of the pushrod of the fore and aft pressure cylinder 21. The fore and aft cylinder 21 is fixed to the pushrod of the left and right pressure cylinder 22, which is in turn fixed to the pushrod of the up and down pressure cylinder 23. The up and down pressure cylinder is fixed to the stationary frame of the device.

The movable frame 20 is guided parallel to the guide bars 25, 26, and 27 in the fore and aft, left and right, and up and down directions respectively.

Referring to FIG. 3, tape is cut by the cutter 19 as follows.

(a) The cutter 19, which is originally located behind the tape, is moved to the right, to the cutting position at the center of the tape. The movable frame is in the raised position during this operation.

(b) Next, with the cutter 19 still in the raised position, it is moved forward to a location on top of the tape 2 or 6.

(c) The cutter 19 is lowered to the surface of the tape for cutting.

(d) The cutter 19 is drawn back severing the tape 2 or 6.

As is shown in FIG. 3 and FIG. 4, the splicing means comprises a pressure block 29, three pressure cylinders (not illustrated) to move the pressure block 29 fore and aft, left and right, and up and down, and a splicing tape supply system to deliver splicing tape 28 to the bottom surface of the pressure block 29. The pressure block 29 holds the splicing tape 28, which it presses onto the upper surfaces of the leader 2 and magnetic 6 tapes to perform a splice.

The pressure block 29 is constructed in the same manner as the movable frame 20 with three sets of pressure cylinders and guide bars. With splicing tape 28 attached to the bottom surface thereof, the pressure block 29 joins the tapes 2 and 6 as follows.

(a) While in the raised position, the pressure block 29 is moved to the left to line up with the splice line.

(b) Still in the raised position, the pressure block 29 is moved forward to a position on top of the tape.

(c) The pressure block 29 is lowered to the splice, and splicing tape 28 is pressed onto the leader 2 and magnetic 6 tapes to join them.

(d) The pressure block 29 is raised.

(e) The pressure block 29 is moved backward away from the tape.

(f) The pressure block 29 is moved to the right, returning it to the standby position.

For each splice, steps (a) through (f) are repeated, thus joining the leader 2 and magnetic 6 tapes by attaching adhesive splicing tape to their upper surfaces.

The splicing tape supply system, which delivers a predetermined length of splicing tape 28 to the bottom surface of the pressure block 29 comprises a shuttle block 30 which draws splicing tape 28 off of a spool, an interim block 31 located between the shuttle block 30 and the pressure block 29, which attaches to the bottom surface of the end of the splicing tape 28, and a cutter 32 which cuts the splicing tape 28 at the surface of the pressure block facing the shuttle block 31.

The bottom attachment surfaces of the shuttle block 30, the interim block 31, and the pressure block 29 in the standby position are all aligned in a common plane. Although it is not illustrated, the bottom surfaces of all these blocks have suction holes to allow attachment of the splicing tape 28. These suction holes are connected to a vacuum system through control valves.

With splicing tape 28 attached to its bottom surface, the shuttle block 30 is moved from the right to the left, delivering a fixed length of splicing tape to the interim block 31 and the pressure block 29. When the shuttle block 30 is moved from the left to the right, splicing tape 28 is released from the bottom of that block. At this point, the end of the splicing tape 28 is held attached to the bottom surfaces of the interim block 31 and the pressure block 30. The cutter 32 is raised to cut the thus held splicing tape 28 at the surface of the pressure block 29 facing the interim block 31.

During operation of the splicing means to join leader 2 and magnetic 6 tapes, the cutter 19, which severs either leader 2 or magnetic 6 tape, is withdrawn to a position out of the path of the pressure block 29.

The apparatus for winding magnetic tape into cassettes having the configuration described above, winds magnetic tape into cassettes in the following manner.

(1) The cassette case 1 is secured in a fixed position and the guard panel is opened.

(2) The tape extraction rollers 10 inserted at the inner side of the exposed leader tape 2, draw the leader tape from the cassette case 1 and attach it to the upper surfaces of the first 11 and second 12 tape retainers. At this point, the first 11 and second 12 tape retainers are adjacent, with their attachment surfaces lined up in the same plane, and the third tape retainer 13 is in a standby location corresponding to the solid line position of FIG. 1.

(3) The cutter 19 severs the leader tape 2 between the first 11 and second 12 tape retainers. During this operation, the leader tape 2 is held attached to the first 11 and second 12 tape retainers.

(4) The second tape retainer 12 is moved away from the first tape retainer 11 to a standby position, while the third tape retainer 13 is moved adjacent to the first tape retainer 11, so that its upper surface is aligned in the same plane with that of the first tape retainer 11. At this stage also, leader tape 2 is held attached to the first 11 and second 12 tape retainers, and magnetic tape 6 is held attached to the third tape retainer 13.

(5) The leader tape 2 and magnetic tape 6, held on the adjacent and coplanar upper surfaces of first 11 and third 13 tape retainers, are joined together by the splicing means.

(6) Next, the spliced leader 2 and magnetic 6 tape is released from the first 11 and third 13 tape retainers, and the cassette hub 24, to which the leader tape 2 is attached, is rotated by the winding means to wind the connected magnetic tape 6 into the cassette case 1.

(7) After a predetermined length of magnetic tape 6 has been wound, the rotation of hub 24 is stopped, and the first 11 and third 13 tape retainers attach to the magnetic tape 6.

(8) The cutter 19 severs the magnetic tape 6 between the first 11 and third 13 tape retainers.

(9) The third tape retainer 12, with the magnetic tape 6 attached, is moved to its standby position shown by solid lines in FIG. 1, while the second tape retainer 12 is moved from its standby position to the position shown by broken lines in FIG. 1, adjacent to the first tape retainer 11.

(10) The end of the magnetic tape 6, held by the first tape retainer 11, is joined to the cut end of the leader tape 2 held by the second tape retainer 12, by the splicing means. In steps (8), (9), and (10) of this procedure, tape is held attached to the first, second, and third tape retainers 11, 12, and 13.

(11) Tape is released from the first 11 and second 12 tape retainers, and the extraction rollers 10 are moved to the position shown by broken lines in FIG. 1.

(12) The hub 24 is rotated to take up slack tape into the cassette case 1.

(13) The cassette case 1 is replaced with another case not wound with magnetic tape.

This procedure is repeated and subsequent cassette cases are wound with magnetic tape.

In the apparatus of this invention shown in FIG. 4, the cassette case is oriented vertically with the cassette case front cavity facing downward. Leader tape extracted from the cassette case is surrounded by the cassette case, the guard panel, and the tape retainers, thereby protecting the leader tape from dust.

It is also possible to invert the apparatus of FIG. 4 so that the cassette case front cavity faces upward, and the upper surface of the extracted leader tape is covered by the tape retainers.

Regardless of the cassette case orientation, the specified relative position of the tape retainers with respect to the cassette case allows the extracted leader tape to be surrounded by the cassette case, the tape retainers, and the guard panels, and the leader tape is thus afforded protection against foreign object attachment.

Accordingly, the present invention does not limit the manner in which the cassette case is positioned.

The cassette case shown in FIG. 6 has a double bottom, such that the outermost panel is free to slide over the body of the cassette case and close off the hub openings when removed from the tape winding apparatus. Furthermore, closing the guard panel allows complete enclosure of the magnetic tape wound in the cassette. This type of cassette case provides for an extreme reduction in the amount of dust that gets on the magnetic tape after it has been wound into that cassette.

As shown in FIG. 1, the outside surface (the bottom surface as illustrated in FIG. 1) of leader tape, extracted from a cassette case held in place by a positioning means, is held adjacent to the cassette case's open guard panel by a retaining means. The retaining means consist of separately movable first and second tape retainers, to which the leader tape outside surface is attached, and between which a cutter is inserted to sever the tape. The second tape retainer, shown on the left in FIG. 1, is moved to a new position separating the severed tape. This second tape retainer is not moved far from the cassette case front cavity, but rather is maintained next to the guard panel in a standby position that does not interfere with the splicing and cutting magnetic tape.

The first and second tape retainers remain attached to the severed ends of the leader tape. An end of magnetic tape held by a third tape retainer is moved next to the end of the leader tape held by the first tape retainer, and the leader and magnetic tapes are joined by a splicing means. The spliced leader and magnetic tape is released from the tape retainers, a cassette reel hub is rotated, and magnetic tape is wound into the cassette. When a predetermined length of magnetic tape has been wound into the cassette, hub rotation is stopped, and the tape is attached to the first and third tape retainers. The cutter is inserted between the first and the third tape retainers and the magnetic tape is cut. After the cutter is withdrawn from the tape cutting point, the third tape retainer is lowered to move a cut end of magnetic tape out of the way. Then the second tape retainer is lowered to line up the cut end of the leader tape with the other cut end of magnetic tape. The leader and magnetic tapes are joined together, and released from the first and second tape retainers. In cases where extraction rollers are inserted inside the leader tape loop, these rollers are removed, and the cassette hub is rotated to wind in slack magnetic and leader tape to the position shown by broken lines in FIG. 1.

Since the first and second tape retainers which attach to, and extract leader tape from the cassette case are located next to the cassette guard panel, and since their attachment surfaces are parallel to a plane extending through the reel hub axes of the cassette so as to close off the cassette front cavity, leader tape extracted from the cassette case is surrounded by the guard panel, the tape retainers, and the cassette case. Furthermore, the second tape retainer holding a cut end of leader tape is moved to a standby position out of the path of the magnetic tape but close to the cassette guard panel. For these reasons, compared with conventional models in which a considerable length of leader tape remains outside the case for a long period, the present invention can drastically reduce dust and foreign particle contamination.

In other words, an extreme reduction in the amount of dust, etc. attachment to the easily contaminated extracted leader tape can be achieved, and therefore, high quality magnetic recording as well as error free and noise free playback can be realized.

Furthermore, since the quantity of leader tape extracted from the cassette case can be extremely small, the total length of the leader tape can be short, and the nonrecordable tape length at both ends of the magnetic tape can also be short.

Furthermore, since the amount of extracted leader tape is short and the amount of movement of the tape retainers is small, tape retainer movement time, tape extraction time, and final slack tape winding time can be reduced. Thus, the possibility of improved productivity, in terms of processing time per cassette, is realized as an accompanying feature.

What is claimed is:

1. An apparatus for winding magnetic tape into a cassette having a cassette case including a front cavity, rotatable reel hubs within the cassette case, and leader tape extending across the cavity and around the reel hubs, said apparatus comprising:

a frame;

positioning means for holding a cassette case;

tape retaining means for holding a leader tape adjacent the front cavity of the cassette case;

said tape retaining means comprising a first and a second tape retainer having attachment surfaces adjacent and facing the front cavity of the cassette and on which surfaces the leader tape is held when the cassette is held by said positioning means, and a third tape retainer for holding a leading end of a magnetic tape;

cutting means for cutting the leader tape held by the first and the second tape retainers, one cut end of the leader tape being held on the attachment surface of the first tape retainer while another cut end of the leader tape is held on the attachment surface of the second tape retainer;

separating means for swinging one of said first and said second tape retainers between a first position adjacent the front cavity of the cassette case and a standby position at which said one cut end of the leader tape is separated from said another cut end of the leader tape, the attachment surface of said one of said first and said second tape retainers remaining adjacent and facing the front cavity of the cassette when said one of said first and said second tape retainers is at said standby position and the cassette is held by said positioning means;

splicing means for joining the leading end of the magnetic tape to one of the cut ends of the leader tape after said cut ends of the leader tape are separated; and winding means for rotating one of said reel-hubs to wind a predetermined length of the magnetic tape joined to the leader tape into the cassette, said cutting means also for cutting the magnetic tape after being wound into the cassette so as to form a trailing end thereof, and said splicing means also for joining the trailing end of the magnetic tape to the other of the cut ends of the leader tape.

2. An apparatus as claimed in claim 1, wherein said separating means comprises a rotatable arm having a first end pivotally mounted to the frame at a pivot point and a second end to which said one of said first and said second tape retainers is mounted, and means for rotating said arm about the pivot point.

3. An apparatus as claimed in claim 2, wherein said means for rotating is a piston device comprising a cylinder pivotally mounted to the frame and a piston rod attached to the rotatable arm.

* * * * *